Patented June 21, 1927.

1,632,845

UNITED STATES PATENT OFFICE.

ALFRED OBERLE, OF OAK PARK, ILLINOIS.

CARBONACEOUS MATERIAL AND PROCESS OF MAKING THE SAME.

No Drawing. Application filed July 31, 1924. Serial No. 729,343.

This invention relates to improvements in carbonaceous material and a process for making the same, and refers more particularly to a process in which carbonaceous material resulting from the treatment of mineral oils or their derivatives are relieved of their volatile material and impurities and so modified to produce a refined carbonaceous substance.

This application is a continuation in part of a previous application Serial No. 672,648, filed November 3rd, 1923.

Among the objects of the invention, are, to provide a process for treating carbonaceous material to produce a manufactured carbonaceous product adapted to be utilized in the manufacture of brushes for dynamos, electrodes for electrical furnaces, arc light electrodes, carbonaceous elements for the electrolytic treatment of materials such as electrolysis, etc.; to provide a process in which coke produced from mineral oils is reduced in a relatively simple treatment to a fine grain or a very finely divided material adaptable to be molded into desired shapes for electrical appliances where a smooth carbonaceous substance having a uniform character throughout is essential; to provide a product which is somewhat graphitic in its nature but is not of such a bulky character that it cannot be readily molded by the addition of an adhesive substance, and, in general, to provide a product and process hereinafter described in more detail.

In preparing carbon for use in electrical appliances, or electrical purposes, certain necessary characteristics must be present which vary somewhat according to the purpose for which the carbon is to be used. Carbon for the manufacture of electrodes used in heating furnaces, carbon for electric arc lights, or for electrolysis, may be relatively coarse-grained and the absence of impurities is not as essential as when used for certain other purposes. When, for instance, brushes are to be made for dynamos, or where a metal traveling at high speed where it must necessarily have a smoothness when adapted to eliminate friction and at the same time prevent scoration produced by gritty impurities, the carbonaceous material must necessarily be of considerably higher grade. In order to produce carbon which will be suitable for use in dynamo brushes and like purposes, it has heretofore been necessary to incorporate therein a considerable amount of lampblack or a like relatively expensive high-grade carbon.

The novelty of the present invention lies particularly in the production of a carbonaceous material adaptable to the purposes hereinbefore mentioned including the utilization of the product where only the very highest grade material could heretofore be employed. As a raw material, I prefer a carbon obtained from hydrocarbons, especially mineral oils or their derivatives. This carbonaceous material, petroleum coke or free carbon filtered from residual substances, is disintegrated or pulverized in a ball mill to form a mass of very finely divided material, the carbon being present in discreet particles. This material is charged into a still and is there heated, the moisture distilling off certain impurities and volatile material in the form of superheated vapors. In addition to the moisture in the mass, superheated steam may be introduced to promote the distillation and elimination of volatile impurities. Temperatures utilized may range from 800° to 1200° F. and corresponding pressures may be utilized which are necessary to obtain a satisfactory treatment. Normally, pressures ranging from 50 to 500 pounds are maintained, preferably, however, pressures of 300 pounds have been found to result in the most satisfactory treatment. This heat treatment with steam under pressure relieves the carbon of its impurities which pass off with the vapor due to the leaching effect of the moisture present. The crude carbon from different sources, that is, carbon from petroleum coke and carbon from petroleum residue, may necessitate different conditions of temperature and pressure to effect the desired treatment in order to satisfactorily eliminate the objectionable impurities.

Subsequent to the pressure treatment, the carbonaceous material is preferably subjected to a vacuum treatment in the presence of steam,—similarly to the manner in which the carbon is treated in my prior application. The presence of the moisture tends to facilitate the building up of pressure besides effecting a better distribution of heat. It also promotes the evolution of vapors and the elimination of distillable impurities. It further prevents the formation of gritty material which normally results when heating coke. The presence of the steam improves the characteristics of the finished product to a marked degree. It also prevents the heating of the carbon to temperatures at which certain products present fuse and prevent the complete elimination of impurities due to the clogging or filling up of the porous amorphous carbon.

Besides steam, other gases—such as combustion gases, natural hydrocarbon gases and other relatively inert mediums,—are more or less effective in the treatment of the carbonaceous matter. After the steam both with pressure and vacuum, the carbon is preferably treated with acid,—either with sulphuric acid or nitric acid or a combination of both. Oxydizing agents generally may be used in this treatment, and even certain reducing agents have an advantageous effect. This acid tends to further eliminate impurities remaining in the carbon, or increase the fineness even to the extent of forming colloidal carbon. In treating the carbon with acid, care must be taken that the acid used does not attack the metal of the still and equal mixer of concentrated sulphuric acid and nitric acid will not attack the metal, but should either of these acids be used separately, the carbon should be treated in a special non-corrosive lined retort. The acid reacts with the treated carbon with a considerable evolution of heat. Subsequent to the acid treatment, the treated material and acid are separated either by filtration, gravitation, or other suitable means for separation, and the carbon water-washed and dried. In this state, the carbon is ready for the manufacturer. To be molded into suitable forms, it is only necessary to add a small quantity of adhesive substance sufficient to make the carbon particles adhere when subjected to the high temperature and pressure in the molds.

As previously mentioned, the carbon required for the various electrical uses have very different properties. The properties of these finished products call for not only different physical characteristics but also chemical variations which can only be brought about by varying the method of treatment, particularly the temperatures and pressures utilized, the steam treatment and the character of the subsequent purification or acid treatment.

The specific properties required for producing carbon brushes for dynamos is typical of probably the highest grade product made. In the first place, the carbon must be very finely divided or in discreet form, preferably colloidal in nature. At the same time, it is essential that the carbon is not too light or it necessitates the use of too much pitch, tar or other adhesive substance to satisfactorily bind the carbon in the molding operation. Also, an excess of the binder, such as pitch or tar, introduces undesirable volatile hydrocarbons which, when heated in the press or mold, form air bubbles and produce vacuoles which are decidedly objectionable. Further, carbon heated at excessive temperatures, when undergoing treatment, becomes gritty and wears out the copper commutators of the electrical appliances in a short period of time. Air bubbles, or gritty formations in the carbon, reduce the uniformity and effectiveness of the resulting product. The most desirable product, as far as its properties are concerned, is a soft carbon easily compressed having the particles in discreet or very finely divided form. Carbon which is free, or practically free, from volatile matter and containing little or no ash, especially free from silicates, constitutes the most desirable carbon for electrical purposes. Such a carbon can be readily produced by the treatment hereinbefore described. Lampblack is too light and bulky to be compressed without an abnormal amount of pitch or binder. It smudges the commutator of the dynamo,—necessitating continuous cleaning.

Carbon produced by the process explained is soft and amorphous or collidal in character, readily molded with relatively small amounts of adhesive or binder substances and contains a minimum amount of solid impurities which give a smooth, uniform product admirably adapted to be utilized for high-grade electrical work such as commutator brushes, which coarser-grained carbon may be produced by varying to the desired degree the method of treatment,—particularly the pressure and temperature ranges and the subsequent purifying acid treatment. Under certain conditions, it may be desirable to acid treat the carbon both prior and subsequent to the heat treatment. However, under normal conditions, the subsequent acid treatment is sufficient to eliminate the impurities to the desired extent and to disintegrate the carbon particles to the desired size.

I claim as my invention:

1. A process for making carbonaceous material, consisting in heating petroleum carbon in the presence of moisture under pressure to drive off the volatile material, treating the resulting carbon with a purifying liquid to remove impurities by chemical action.

2. A process for producing carbonaceous material, consisting in heating a carbon resulting from the destructive conversion of hydrocarbons under temperature and pressure conditions in the presence of moisture to drive off the volatile material, subsequently imposing a vacuum action while maintaining the carbon in a highly heated state and treating the resultant carbonaceous material with an acid to remove remaining impurities.

3. A process for producing carbonaceous material, consisting in heating a carbon resulting from the destructive conversion of hydrocarbons under temperature and pressure conditions in the presence of moisture to drive off the volatile material, subsequently imposing a vacuum action while maintaining the carbon in a highly heated state and treating the resultant carbonaceous material with an acid to remove remaining impurities, and mixing the resulting product with an adhesive material and molding the same into predetermined forms by heat and pressure.

4. A process for producing carbonaceous material, consisting of heat treating a petroleum carbon in the presence of moisture by successive pressure and vacuum treatments to remove the volatile material by distillation, subjecting the relatively dry product to an acid purifying treatment and mixing the resultant product with an adhesive substance and molding the mixture into predetermined forms with heat and pressure.

5. A process for producing carbonaceous material, consisting in pulverizing a petroleum carbon, heat treating a petroleum carbon in the presence of moisture by successive pressure and vacuum treatments to remove the volatile material by distillation, subjecting the relatively dry product to an acid purifying treatment and mixing the resultant product with an adhesive substance and molding the mixture into predetermined forms with heat and pressure.

6. A process for producing carbonaceous material from petroleum carbons having a high degree of electrical conductivity, comprising the steps of applying heat to the carbon to drive off the volatile products and extracting the remaining impurities with solvent materials, molding the carbonaceous material by the addition of an adhesive substance and the imposition of heat and pressure.

ALFRED OBERLE.